UNITED STATES PATENT OFFICE.

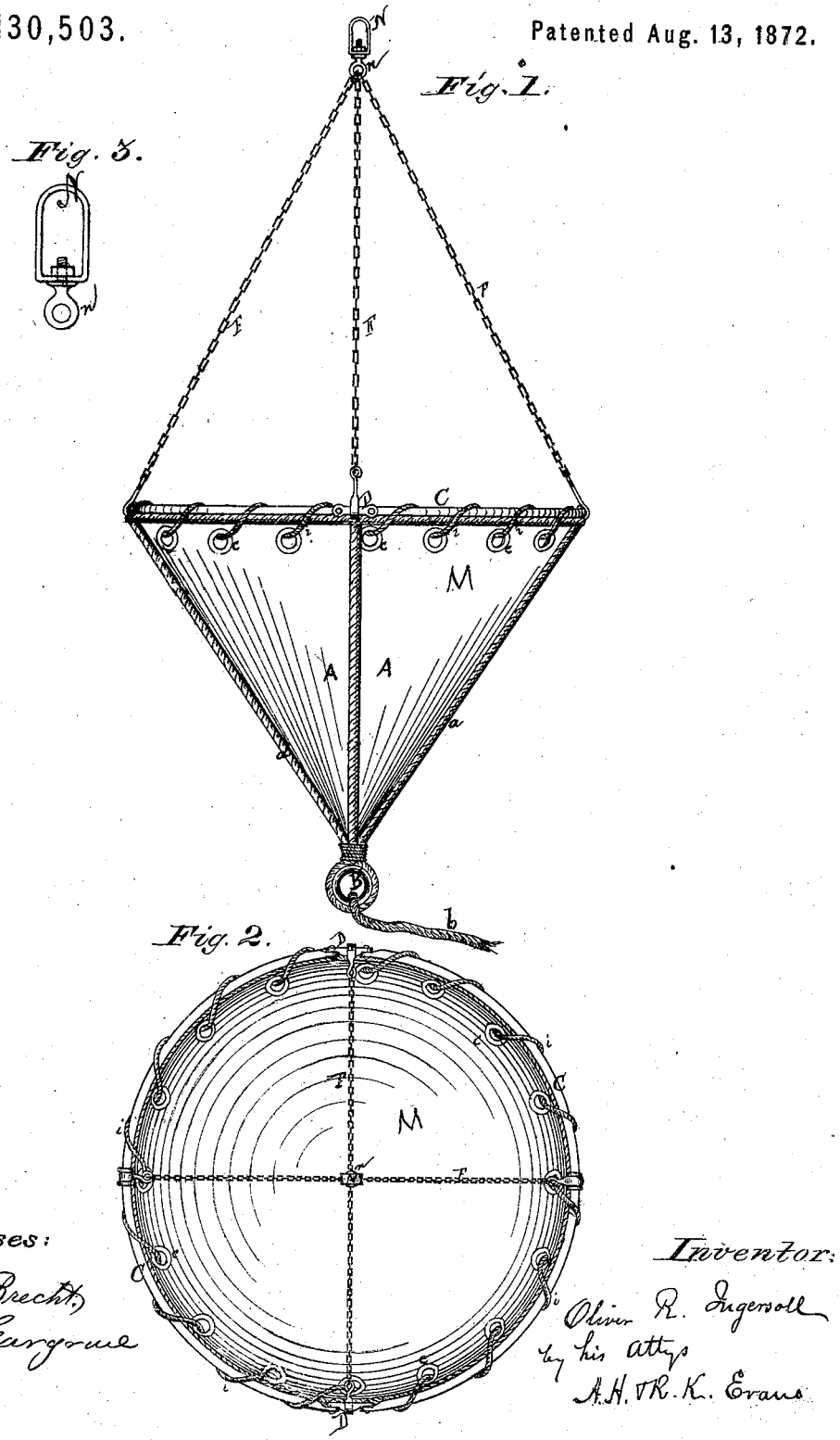

OLIVER R. INGERSOLL, OF NEW YORK, N. Y.

IMPROVEMENT IN MARINE-DRAGS.

Specification forming part of Letters Patent No. 130,503, dated August 13, 1872.

*To all whom it may concern:*

Be it known that I, OLIVER R. INGERSOLL, of the city and State of New York, have invented a new and Improved Marine-Drag, of which the following is a full, clear, and exact description, reference being had to the accompanying drawing making a part of this specification, in which—

Figure 1 is a side view of my improved drag. Fig. 2 is a front view of the same.

My invention has for its object to provide a light, substantial, and cheap marine-drag, which will not require the attachment of any weight to it to keep it from jumping out of the water or skipping; and wherein the twisting or unwrapping of the ship's hawser by the whirl of the drag is prevented; and, also, wherein the water is emptied from the drag in hauling it on board, and the labor of hauling it in thereby greatly decreased. My invention consists in a funnel-shaped bag, made of heavy canvas or other suitable material, fastened to a jointed hoop, which is connected to a shackle by chains or ropes arranged around the hoop, and a hawser is rove into a swivel on said shackle. A means is provided for attaching a rope to the point of this funnel-shaped bag, so that it may be hauled on board point foremost, and the action of the water causes the hoop to double up and close the bag, making it comparatively easy to draw it through the water.

In order that those skilled in the art may make and use my invention, I shall proceed to describe the manner in which I have carried it out.

In the said drawing, W is a bag, in which A A are pieces of canvas or other suitable material, cut of a proper shape to form the sections of the drag. These are sewed together very closely and strongly, and a rope, *a a*, is sewed along each of these seams. Where these ropes meet at the peak they are rove around a ring or eyelet, B, which serves for the attachment of a rope, *b*, to the peak of the drag. In a stout hem at the mouth of the bag is a row of eyelets, *c c*, by which the bag is whipped on to a metallic ring, C, by means of the cord *i*. The ring C may be made in sections, which are held together by links D, so that the action of the water will close up the ring when the bag is being drawn in by means of the rope *b*. Fastenings F F are attached to the ring C, and converge to a shackle, *n*, which works in a swivel, N. To this swivel is attached the hawser which holds the drag to the ship.

The operation is as follows: When the drag is thrown overboard, the water is caught in the bag and keeps the drag down and retards the ship, the line *b* being left slack. The swivel N prevents the twisting or untwisting of the hawser. When the drag is to be taken in, the line *b* is drawn taut and the hawser slackened, when the drag "upsets" and, emptying the water out, the mouth is closed by the action, when it is hauled in.

Having thus described my invention, what I claim as new, and desire to secure by Letters Patent, is—

The folding ring C with its links D, in combination with the net-shaped bag W with its eye B, substantially as described, so that the mouth of the drag will close when being hauled on ship-board, as set forth.

O. R. INGERSOLL.

Witnesses:
E. W. BETHUNE,
W. Z. WRIGHT.